UNITED STATES PATENT OFFICE 2,449,173

ALKENYL SULFOLANYL AND SULFOLENYL CARBONATES

Rupert C. Morris, Berkeley, and Edward C. Shokal, Oakland, Calif., assignors to Shell Development Company, San Francisco, Calif., a corporation of Delaware No Drawing. Application July 13, 1945, Serial No. 604,974

9 Claims. (Cl. 260—329)

This invention relates to unsaturated esters of carbonates which have been mono-esterified by a hydroxylated cyclic sulfone. More particularly, the invention pertains to beta,gamma-unsaturated aliphatic alcohol esters of monosulfolanyl carbonates and monosulfolenyl carbonates, and to methods for producing them. Specifically it is directed to the sulfolenes and more particularly the sulfolanes having a nuclear carbon atom of the cyclic sulfone ring attached by an oxygen atom to a carbonyl group which is directly attached to the oxygen atom of a beta,gamma-unsaturated alkenoxy radical.

The term "a sulfolane" as employed herein and in the appended claims, refers to a structure containing four carbon atoms and a sulfur atom in a ring, the sulfur atom of this five-membered heterocyclic ring having two oxygen atoms attached thereto. The structural formula of the simple unsubstituted sulfolane is

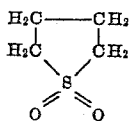

This compound has also been termed "thiacyclopentane-1,1-dioxide," "thiolane-1,1-dioxide," "cyclotetramethylene sulfone" or "dihydrobutadiene sulfone." The term "a sulfolane" broadly covers not only the compound described above, but also the substituted derivatives of this compound wherein various organic and/or inorganic radicals such as the halogen atoms, the hydroxyl group and the hydrocarbon radicals are substituted for one or more of the hydrogen atoms of the above structure.

Similarly the term "a sulfolene" is meant to include a structure containing four carbon atoms and a sulfur atom in a ring, the sulfur atom having two oxygen atoms attached thereto, and two vicinal nuclear carbon atoms being joined together by an olefinic linkage. This compound has also been called "thiacyclopentene-1,1-dioxide." Generically, the term "a sulfolene" covers the simple unsubstituted sulfolene as well as the substituted derivatives thereof. The double bond in the sulfolenes may be between any two of the adjacent carbon atoms of the ring, i. e. 2-sulfolene and 3-sulfolene as well as the derivatives thereof wherein various organic and/or inorganic radicals are substituted for one or more of the hydrogen atoms of the sulfolene nucleus.

Similarly, "a sulfolanyl radical" is the monovalent radical resulting from the removal of a hydrogen atom from a nuclear carbon atom of "a sulfolane," and "a sulfolenyl radical" is the monovalent radical resulting from the removal of a hydrogen atom from a nuclear carbon atom of "a sulfolene."

It is an object of the invention to provide a new class of compounds possessing unexpectedly useful properties. The newly prepared compounds comprise a cyclic sulfone having four carbon atoms and the sulfone sulfur atom embraced in a five-membered cycle wherein at least one nuclear carbon atom is directly attached by a single bond to an oxygen atom which is directly attached to a carbonyl group, said carbonyl group being directly linked to an oxygen atom which is linked directly to an unsaturated hydrocarbon radical.

A group of these novel and useful compounds may be represented by the formula

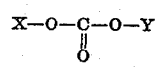

wherein X represents a sulfolanyl or sulfolenyl radical, and Y represents an unsaturated organic radical containing an unsaturated linkage between two non-aromatic carbon atoms, and is preferably a beta,gamma-unsaturated hydrocarbon radical.

Examples of suitable unsaturated radicals which Y may represent are vinyl, isopropenyl, cyclopentenyl, cyclohexenyl, propargyl, allyl, methallyl, crotyl, tiglyl, cinnamyl, ethallyl, methyl vinyl carbinyl, beta-chloroallyl and furfuryl.

Suitable sulfolanyl radicals which X may represent are 3-sulfolanyl, 2-sulfolanyl, 4-chloro-3-sulfoanyl, 4-hydroxy-3-sulfolanyl, 3-methyl-3-sulfolanyl, 2-ethyl-3-sulfolanyl, 3-methyl-2-sulfolanyl, 2-propyl-2-sulfolanyl, 4-allyl-3-sulfolanyl, 2 - methyl, 3 -methallyl-3-sulfolanyl, 2-methyl, 4 - ethyl-3-sulfolanyl, 2-phenyl-3-sulfolanyl, 4-cyclohexyl-3-sulfolanyl, and the like and their homologues and analogues. Suitable sulfolenyl radicals are 2-sulfolen-3-yl, 3-sulfolen-4-yl, 2-sulfolen-4-yl, 4-methyl 2-sulfolen-3-yl, and the like and their homologues and analogues.

The numbering system of the sulfolane ring is in accordance with the system as exemplified by the compounds of this type of ring structure given on page 44 of Patterson and Capell, the Ring Index, Reinhold Publishing Corp., New York, 1940; Am. Chem. Soc. Monograph No. 84, and is as indicated below:

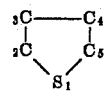

It has been found that the unsaturated alcohol esters of monosulfolanyl carbonates possess inherent properties which make them particularly valuable substances which finds a wide variety of uses. They act as plasticizers and tackifiers for plastics and elastomers, and they serve as starting materials for numerous chemical syntheses. They may also be used as reagents in the textile, dye and related industries. The unsaturated alcohol esters of monosulfolanyl carbonates are particularly valuable for use in the preparation of polymers and copolymers which have excellent durability and offer as well a fine physical appearance.

A preferred subgroup of the novel compounds comprises the beta,gamma-unsaturated alcohol esters of monosulfolanyl carbonates in which the sulfolanyl radical is attached at the ring carbon atom in the 3-position, the remaining free bonds of the nuclear carbon atoms of the sulfolanyl ring being taken up by hydrogen atoms, halogen atoms and/or saturated aliphatic hydrocarbon radicals. In other words, the preferred group comprises the beta,gamma-unsaturated alcohol ester of mono(3-sulfolanyl) carbonates and may be represented by the formula

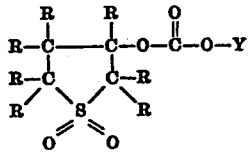

wherein R is a member of the group consisting of the hydrogen atom, the halogen atoms and the saturated aliphatic hydrocarbon radicals and Y is a hydrocarbon radical containing an olefinic linkage between two carbon atoms of aliphatic character one of which is directly linked to a saturated carbon atom which is directly attached to the oxygen atom in the above formula. Examples of beta,gamma-unsaturated hydrocarbon radicals which Y represents are allyl, methallyl, crotyl, tiglyl, methyl vinyl carbinyl, ethallyl and cinnamyl.

The beta,gamma-unsaturated alcohol esters of mono(3-sulfolanyl) carbonates are particularly valuable in the preparation of polymers and copolymers which are characterized by excellent resistance to the action of physical and chemical agents. Resins can be produced which are clear, water-white, hard and infusible. Many of the polymers possess film-forming properties and adhere well to metal and to many other kinds of surfaces. They can be used as the basis for valuable coating compositions, and some of the solid resinous polymers or copolymers can be used as glass substitutes. One of the outstanding advantages of these unsaturated alcohol esters of sulpholanyl carbonates is their ability to reduce color formation in the polymerization of other polymerizable unsaturated compounds in the presence of peroxide catalysts. It has been found that relatively very small amounts of the carbonates of the invention are effective in reducing color formation. Massive castings made from polymers or copolymers of the carbonate esters can be subjected to machine operations, and many of the resins can be used in extrusion, injection molding and compression molding processes.

Example of the preferred beta,gamma-unsaturated alcohol esters of mono(3-sulfolanyl) carbonates are allyl 3-sulfolanyl carbonate, methallyl 3-sulfolanyl carbonate, crotyl 3-sulfolanyl carbonate, allyl 3-methyl-3-sulfolanyl carbonate, methallyl 2-methyl-3-sulfolanyl carbonate, allyl 4-methyl-3-sulfolanyl carbonate and methallyl 4-ethyl-3-sulfolanyl carbonate.

Another group of suitable compounds consists of derivatives of a sulfolane or a sulfolene wherein each of the nuclear carbon atoms in positions 3 and 4 is directly attached to an oxygen atom which is linked directly to a carbonyl group, said carbonyl group being directed attached to an oxygen atom which is linked directly to an unsaturated hydrocarbon radical. The sulfolanyl compounds of this group may be represented by the general formula

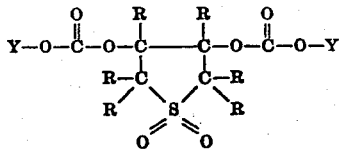

wherein Y is an unsaturated hydrocarbon radical which is preferably unsaturated in the beta,-gamma-position, and R is preferably a hydrogen atom, a halogen atom, or a saturated aliphatic hydrocarbon radical. Examples of compounds in this group are those having the following formulas:

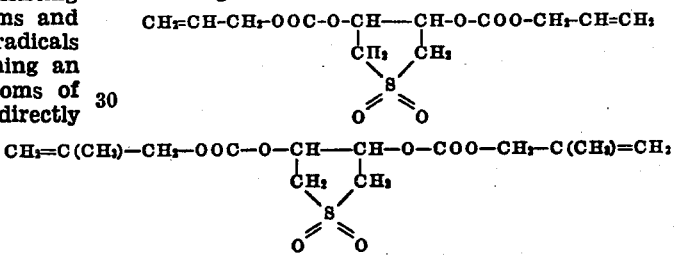

Another group of suitable compounds consists of derivatives of sulfolane wherein each of the nuclear carbon atoms in positions 2 and 3 is directly attached to an oxygen atom which is linked directly to a carbonyl group, said carbonyl group being directly attached to an oxygen atom which is linked directly to an unsaturated hydrocarbon radical. Compounds in this group may be represented by the general formula

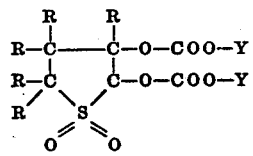

wherein Y is an unsaturated hydrocarbon radical which is preferably a beta-gamma-unsaturated hydrocarbon radical, and R is preferably a hydrogen atom, a halogen atom, or a saturated hydrocarbon radical. Examples of compounds in this group are those represented by the following formulas:

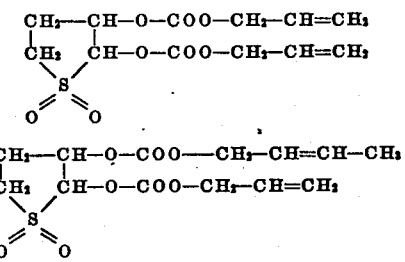

The unsaturated alcohol esters of monosulfolanyl and monosulfolenyl carbonates can be produced by numerous methods of synthesis. One method comprises first producing the monosulfolanyl or monosulfolenyl carbonate and subsequently esterifying with the unsaturated alcohol. The monosulfolanyl or monosulfolenyl carbonate can be produced by reacting the hydroxy sulfolane or sulfolene with a halogen-substituted formic acid. For instance, 3-sulfolanol can be reacted with chloroformic acid to form mono-(3-sulfolanyl) carbonate. In some cases it may be preferred to react a metal or an alkali metal derivative of the hydroxy sulfolane or sulfolene upon the halogen-substituted acid. Instead of the halogen-substituted acid itself a derivative thereof may be used as a reactant. For instance, a sulfolanyl carbonate may be produced by reacting 3-sulfolanol with phosgene followed by the conversion of the resulting sulfolanyloxy formyl chloride to the acid by known methods.

The monosulfolanyl and monosulfolenyl carbonates or derivatives thereof can be esterified with unsaturated alcohols by known or special methods. In some cases the esterification can be performed directly by reacting the acid with the alcohol, preferably in the presence of an esterification catalyst such as an alkali metal alcoholate or the like. In other cases it is preferred to react an alkali metal derivative of the acid with the alcohol or with a halide of the alcohol or with an ester of the alcohol with a low-boiling acid. Another method comprises reacting the free acid upon an ester of the alcohol with a low-boiling acid, preferably in the presence of a catalyst such as mercuric sulfate. Another method comprises ester-exchange involving the inter-reaction of an hydroxylated cyclic sulfone with an unsaturated diester of carbonic acid under such conditions that an ester exchange is effected with the formation of the desired unsaturated ester of the monosulfolanyl or monosulfolenyl carbonate and an alcohol. For example, allyl 3-sulfolanyl carbonate may be formed by an inter-reaction between diallyl carbonate and 3-sulfolanol.

A particularly suitable method for producing the sulfolanyl and sulfolenyl compounds of the invention comprises first producing an unsaturated ester of a suitably substituted formic acid, e. g., a hydroxy-substituted, an alkali metalloxy-substituted or a halogen-substituted acid and subsequently converting the compound to the corresponding sulfolanyl or sulfolenyl derivative. The unsaturated esters of substituted formic acid can be produced by the direct esterification of the acid with the alcohol, by acid-exchange, or by ester-interchange, in accordance with one or more of the above-disclosed processes or by other methods. The esters of the hydroxy-substituted formic acid, i. e., the mono-esterified carbonates, may be further esterified with hydroxy sulfolanes or sulfolenes, or functional derivatives thereof. Unsaturated esters of halogen-substituted formic acid can be reacted directly with hydroxy sulfolanes or sulfolenes. For example, the unsaturated esters of monosulfolanyl carbonates may be produced by reacting a sulfolanol with the chloroformic acid ester of an unsaturated alcohol.

Suitable esterifying unsaturated alcohols are compounds having an unsaturated linkage between two carbon atoms of aliphatic character. One subgroup of unsaturated alcohols within the foregoing definition consists of compounds having an unsaturated linkage of aliphatic character between two carbon atoms, one of which is attached directly to an alcoholic hydroxyl group. These compounds are alpha,beta-unsaturated alcohols, e. g., the vinyl-type alcohols which have a structure which may be represented by the general formula

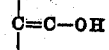

Examples of the vinyl-type alcohols are vinyl alcohol, isopropenol, buten-1-ol-2, propen-1-ol-1, buten-1-ol-1, cyclohexen-1-ol-1, and cyclopenten-1-ol-1, and the like. Vinyl alcohol is the preferred specific alpha,beta-unsaturated alcohol.

Since the preferred compounds of the invention are the beta,gamma-unsaturated alcohol esters of monosulfolanyl carbonates, a particularly important subgroup of unsaturated alcohols consists of compounds having an unsaturated linkage of aliphatic character between two carbon atoms, one of which is attached directly by a single bond to the carbinol carbon atom. These alcohols having a double bond of aliphatic character between two carbon atoms one of which is attached directly by a single bond to the carbinol carbon atom are allyl-type alcohols which have in the molecule a structure which can be represented by the general formula

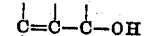

Preferred beta,gamma-unsaturated alcohols have a terminal methylene group attached by a double bond to a saturated carbon atom which is attached directly to the carbinol carbon atom. Representative examples of beta,gamma-unsaturated alcohols are crotyl alcohol, tiglyl alcohol, 3-chlorobuten-2-ol-1, cinnamyl alcohol, hexadien-2,4-ol-1, butadien-2,3-ol-1, hexadien-3,5-ol-2, 2-methyl-hexen-2-ol-1, 2-methyl-penten-2-ol-1, 3,7-dimethyl-octadien-2-,7-ol-1, cyclopenten-2-ol-1, cyclohexen-2-ol-1, and the like, while the preferred type of beta,gamma-unsaturated alcohol having the terminal methylene group includes such alcohols as allyl alcohol, methallyl alcohol, ethallyl alcohol, beta-chloroalyl alcohol, buten-1-ol-3, penten-1-ol-3, hexen-1-ol-3, 3-methyl-buten-1-ol-3, 3-methyl-penten-1-ol-3, 2-methyl-buten-1-ol-3, 2-methyl-penten-1-ol-3, 2,3-dimethyl-buten-1-ol-3, hepten-1-ol-3, 4-methyl-hexen-1-ol-3, 5-methyl-hexen-1-ol-3, 4,4-dimethyl-penten-1-ol-3, octen-1-ol-3, 6-methyl-hepten-1-ol-3, 4-methyl-hepten-1-ol-3, 4,4-dimethyl-hexen-1-ol-3, 3-phenyl-propen-1-ol-3, 3-tolyl-propen-1-ol-3, 4-xylyl-buten-1-ol-3, 3-naphthyl-propen-1-ol-3, 4-chloro-buten-1-ol-3, and 2,5-dimethyl-hexadien-1,5-ol-4.

When an unsaturated ester of a haloformic acid is reacted with a hydroxy sulfolane or sulfolene, the reaction is preferably carried out in the presence of a hydrohalide acceptor. Examples of such acceptors are the alkali-metal hydroxides such as sodium hydroxide, other inorganic bases such as calcium hydroxide and carbonates of inorganic bases. Also effective as hydrohalide acceptors are the organic amines such as trimethylamine, quinoline and more particularly pyridine. The reaction may take place in the presence or absence of suitable diluents or solvents which may be present in amounts sufficient to maintain portions of the reactants and/or products in solution but not enough to cause excessive dilution or to interfere with the reaction in any way.

Any temperature may be used in the reaction of a hydroxy sulfolane or sulfolene with an unsaturated haloformate. However, it has been found that a temperature below room temperature, preferably below about 20° C. provides greatly improved yields. A temperature of about 15° C. provides high yields and requires an exceptionally short reaction time. The use of temperatures of about −5° C. to about −25° C., particularly of about −5° C. to about −10° C., brings about excellent yields, and in addition produces alkenyl sulfolanyl carbonates which are characterized by a much lighter color than those obtained at room temperature or above. These lightly colored esters are of particular value in the preparation of clear and substantially colorless polymers and copolymers which are highly desirable.

The following examples illustrate the invention.

*Example I*

3-sulfolanol was produced by allowing a solution of about 472 grams of 3-sulfolene in about 4.5 liters of approximately 2N potassium hydroxide to stand for about 20 hours at between about 20° C. and about 30° C. After neutralization of the solution with hydrochloric acid and evaporation to dryness, the residue was extracted with acetone. The recovered 3-sulfolanol was purified by fractional distillation.

To a solution of about 136 parts by weight of 3-sulfolanol, approximately 580 parts by weight of chloroform and 86 parts by weight of pyridine were added slowly with stirring a solution of about 120.5 parts by weight of allyl chloroformate in about 174 parts by weight of chloroform. The reaction mixture was kept at about 2° C. to about 4° C. during the addition, then allowed to warm to room temperature. The reaction mixture was washed with distilled water and concentrated under reduced pressure. The residue solidified on standing. It crystallized from isopropyl alcohol in small white plates melting at between 63.5° C. and 65° C. The product was substantially pure allyl 3-sulfolanyl carbonate.

*Example II*

Approximately 134.5 parts by weight of methallyl chloroformate in about 174 parts by weight of chloroform are added to a solution of about 136 parts by weight of 3-sulfolanol in about 580 parts by weight of chloroform and about 86 parts by weight of pyridine according to the procedure described in Example I to produce methallyl 3-sulfolanyl carbonate.

*Example III*

Methallyl 2-sulfolen-4-yl carbonate is produced by reacting methallyl chloroformate with 2-sulfolen-4-ol in accordance with the procedure described in Example I.

*Example IV*

A solution of about 150 parts by weight of 4-methyl-3-sulfolanol in about 580 parts by weight of chloroform and about 86 parts by weight of pyridine is reacted with about 120.5 parts by weight of allyl chloroformate in about 174 parts by weight of chloroform following the procedure described in Example I, to produce allyl 4-methyl-3-sulfolanyl carbonate.

*Example V*

About 20 parts by weight of 3-chloro-4-sulfolanol, were added to approximately 25 parts by weight of allyl chloroformate and about 250 parts by weight of chloroform. The resulting slurry was cooled to about 0° C. and to it about 9.3 parts by weight of pyridine were added with stirring. The mixture was stirred at about 0° C. for approximately four hours, then was treated with dilute hydrochloric acid and the chloroform removed. The residue crystallized on standing. After recrystallization from ethyl alcohol, allyl 3-chloro-4-sulfolanyl carbonate was obtained, melting at 66° C. to 70° C.

This application is a continuation-in-part of copending application, Serial No. 532,662, filed April 25, 1944, now U. S. Patent No. 2,445,799, dated July 27, 1948.

We claim as our invention:
1. Allyl 3-sulfolanyl carbonate.
2. Allyl 3-chloro-4-sulfolanyl carbonate.
3. Allyl 2-sulfolen-4-yl carbonate.
4. A beta,gamma-alkenyl sulfolanyl carbonate.
5. The compounds of the general formula

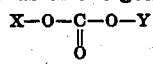

wherein X is a radical of the group consisting of the sulfolanyl radicals and the sulfolenyl radicals, and Y is an alkenyl radical.

6. The compounds of the general formula

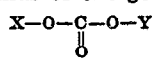

wherein X is a sulfolanyl radical and Y is a beta,gamma-alkenyl radical.

7. The compounds of the general formula

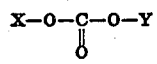

wherein X is a sulfolanyl radical and Y is an alkenyl radical.

8. The compounds of the general formula

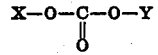

wherein X is a sulfolenyl radical and Y is an alkenyl radical.

9. The compounds of the general formula

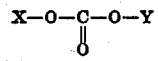

wherein X is a sulfolenyl radical and Y is a beta,gamma-alkenyl radical.

RUPERT C. MORRIS.
EDWARD C. SHOKAL.

REFERENCES CITED

The following references are of record in the file of this patent:

UNITED STATES PATENTS

| Number | Name | Date |
|---|---|---|
| 2,219,006 | Delfs | Oct. 22, 1940 |
| 2,370,570 | Muskat | Feb. 27, 1945 |
| 2,377,111 | Strain | May 29, 1945 |
| 2,379,250 | Muskat | June 26, 1945 |
| 2,393,925 | Morris et al. | Jan. 29, 1946 |
| 2,403,113 | Muskat | July 2, 1946 |

OTHER REFERENCES

Backer, Rec. Trav. Chem. 56, 1071 (1937).
Backer, Rec. Trav. Chem. 62, 816 (1943).
Karrer, "Organic Chemistry," page 204, Nordeman, N. Y., 1938.